US012505787B1

(12) United States Patent
Liao et al.

(10) Patent No.: US 12,505,787 B1
(45) Date of Patent: Dec. 23, 2025

(54) PIXEL CIRCUIT HAVING A PLURALITY OF LIGHT-EMITTING ELEMENT WITH DISPLAY BRIGHTNESS ADJUSTMENT METHOD

(71) Applicant: PlayNitride Display Co., Ltd., MiaoLi County (TW)

(72) Inventors: Kuan-Yung Liao, MiaoLi County (TW); Cheng-Chi Lo, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 0 days.

(21) Appl. No.: 18/764,185

(22) Filed: Jul. 4, 2024

(30) Foreign Application Priority Data

Jun. 21, 2024 (TW) ................................ 113123071

(51) Int. Cl.
*G09G 3/32* (2016.01)
*G09G 3/3233* (2016.01)

(52) U.S. Cl.
CPC ............ *G09G 3/32* (2013.01); *G09G 3/3233* (2013.01); *G09G 2320/0626* (2013.01)

(58) Field of Classification Search
CPC ........................................................ G09G 3/32
USPC ........................................................... 345/55
See application file for complete search history.

(56) References Cited

U.S. PATENT DOCUMENTS 9,711,084 B2 7/2017 Uetake
2008/0074356 A1* 3/2008 Cok .................... G09G 3/3233 345/76
2023/0091644 A1* 3/2023 Charisoulis .......... G09G 3/2074 345/694
2024/0127745 A1* 4/2024 Shin ........................ G09G 3/32

FOREIGN PATENT DOCUMENTS

TW 201729641 8/2017
TW I680445 12/2019

OTHER PUBLICATIONS

"Office Action of Taiwan Counterpart Application", issued on Mar. 11, 2025, p. 1-p. 5.

* cited by examiner

*Primary Examiner* — Long D Pham
(74) *Attorney, Agent, or Firm* — JCIPRNET

(57) ABSTRACT

Disclosed are a pixel circuit and a display brightness adjusting method thereof. The pixel circuit includes a first driver, a first light-emitting element, a second driver, and a second light-emitting element. The first driver is used to provide a driving current according to a display data. The first light-emitting element receives the driving current and emits light according to the driving current. The second driver forms a current splitting path and provides a splitting current according to the display data. The second light-emitting element receives the driving current and the splitting current, and emits light according to the driving current and the splitting current.

11 Claims, 8 Drawing Sheets

PIXEL CIRCUIT HAVING A PLURALITY OF LIGHT-EMITTING ELEMENT WITH DISPLAY BRIGHTNESS ADJUSTMENT METHOD

CROSS-REFERENCE TO RELATED APPLICATION

This application claims the priority benefit of Taiwan application serial no. 113123071, filed on Jun. 21, 2024. The entirety of the above-mentioned patent application is hereby incorporated by reference herein and made a part of this specification.

BACKGROUND

Technical Field

The disclosure relates to a pixel circuit and a display brightness adjusting method thereof, and in particular to a pixel circuit that maintains luminous efficiency at different display brightness and a display brightness adjusting method of the pixel circuit.

Description of Related Art

With the improvement of electronic technology, high-performance and high-quality display devices have become essentials in electronic products. In recent years, light-emitting diodes (LEDs) with self-luminous properties have gradually become important elements in display devices. In particular, with the advent of micro LEDs, using micro LEDs to fabricate high-resolution pixel circuits has become a trend. However, how to ensure that pixel circuits maintain certain work efficiency at both high and low display brightness and improve the luminous stability of micro LEDs at low current densities has become an issue to work on for those skilled in the art.

SUMMARY

The disclosure provides a pixel circuit and a display brightness adjusting method thereof. The pixel circuit maintains high operating efficiency in both regions with high and low display brightness.

A pixel circuit of the disclosure includes a first driver, a first light-emitting element, a second driver, and a second light-emitting element. The first driver is used to provide a driving current according to a display data. The first light-emitting element is coupled with the first driver in series between a power voltage end and a node. The first light-emitting element receives the driving current and emits light according to the driving current. The second driver is coupled with the first light-emitting element in parallel. The second driver forms a current splitting path and provides a splitting current according to the display data. The second light-emitting element is coupled between the node and a reference ground voltage end. The second light-emitting element receives the driving current and the splitting current, and emits light according to the driving current and the splitting current.

A display brightness adjusting method of the disclosure includes the following steps. A first driver is provided to provide a driving current to a first light-emitting element according to a display data, enabling the first light-emitting element to emit light according to the driving current. A second driver is provided and coupled with the first light-emitting element in parallel, enabling the second driver to form a current splitting path and provide a splitting current according to the display data. A second light-emitting element is enabled to emit light according to the driving current and the splitting current.

Based on the above, in the disclosure, the splitting current is adjusted through the current splitting path provided by the second driver corresponding to a brightness for displaying data, thereby adjusting a brightness of the first light-emitting element. When the display data corresponds to a relatively low display brightness, a current density of the second light-emitting element may be increased by reducing the brightness of the first light-emitting element or even turning off the first light-emitting element, thereby improving a luminous stability of a micro light-emitting diode at a low current density. When the display data corresponds to a relatively high display brightness, a peak brightness of the pixel circuit may be increased by reducing the splitting current and enabling both the first light-emitting element and the second light-emitting element to emit light together. This way, the pixel circuit can effectively maintain a luminous efficiency in both display regions with high and low brightness and improve the luminous stability of the micro light-emitting diode at the low current density.

DESCRIPTION OF THE EMBODIMENTS

Figure 1:
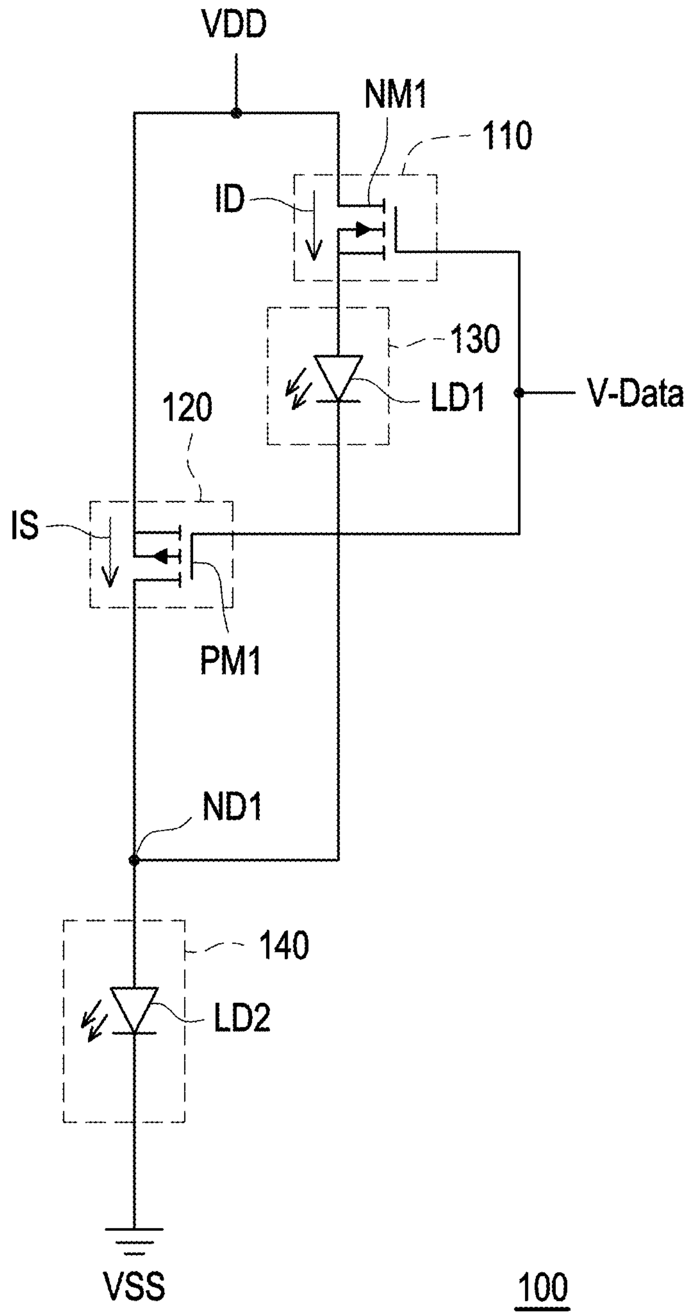
FIG. 1 is a schematic diagram of a pixel circuit in an embodiment of the disclosure.

Please refer to FIG. 1. FIG. 1 is a schematic diagram of a pixel circuit in an embodiment of the disclosure. A pixel circuit 100 includes drivers 110 and 120 and light-emitting elements 130 and 140. The driver 110 and the light-emitting element 130 are coupled to each other in series between a power voltage end VDD and a node ND1. In this embodiment, the driver 110 receives a display data V-Data and generates a driving current ID according to the display data V-Data. The driver 110 provides the driving current to the light-emitting element 130, enabling the light-emitting element 130 to emit light according to the driving current ID.

In addition, the driver 120 is coupled between the power voltage end VDD and the node ND1. The driver 120 is coupled with the light-emitting element 130 in parallel. The driver 120 is used to provide a current splitting path and provide a splitting current IS according to the received display data V-Data.

The light-emitting element 140 is coupled between the node ND1 and a reference ground voltage end VSS. The light-emitting element 140 receives the driving current ID and the splitting current IS, and emits light according to the sum of the driving current ID and the splitting current IS.

In operating details, the driver 110 includes a transistor NM1. A first end of the transistor NM1 is coupled to the power voltage end VDD. A second end of the transistor NM1 may be coupled to the light-emitting element 130. A control end of the transistor NM1 receives the display data V-Data. The transistor NM1 provides a resistance according to the display data V-Data. In this embodiment, the transistor NM1 may be an N-type transistor, wherein the display data V-Data and the resistance provided by the transistor NM1 are inversely related. That is, when the display data V-Data increases, the resistance provided by the transistor NM1 may decrease correspondingly. When the display data V-Data decreases, the resistance provided by the transistor NM1 may increase correspondingly. When the transistor NM1 is completely turned on according to the display data V-Data, the resistance provided by the transistor NM1 is at a minimum value. When the transistor NM1 is completely turned off according to the display data V-Data, the resistance provided by the transistor NM1 is at a maximum value.

The driver 120 includes a transistor PM1. A first end of the transistor PM1 is coupled to the power voltage end VDD. A second end of the transistor PM1 may be coupled to the node ND1. A control end of the transistor PM1 receives the display data V-Data. The transistor PM1 provides a resistance according to the display data V-Data. In this embodiment, the transistor PM1 may be a P-type transistor, wherein the display data V-Data and the resistance provided by the transistor PM1 are positively related. That is, when the display data V-Data decreases, the resistance provided by the transistor PM1 may decrease correspondingly. When the display data V-Data increases, the resistance provided by the transistor PM1 may increase correspondingly. When the transistor PM1 is completely turned on according to the display data V-Data, the resistance provided by the transistor PM1 is at a minimum value. When the transistor PM1 is completely turned off according to the display data V-Data, the resistance provided by the transistor PM1 is at a maximum value.

In this embodiment, when the display data V-Data is lower than a first threshold, the resistance (e.g., a first resistance) provided by the driver 110 may be greater than the resistance (e.g., a second resistance) provided by the driver 120. When the display data V-Data is higher than a second threshold, the resistance (e.g., a third resistance) provided by the driver 110 may be less than the resistance (e.g., a fourth resistance) provided by the driver 120. The first threshold is less than or equal to the second threshold.

The light-emitting element 130 includes a light-emitting diode LD1. The light-emitting diode LD1 may be a light-emitting diode of any form, such as a micro light-emitting diode or an organic light-emitting diode. An anode of the light-emitting diode LD1 may be coupled to the driver 110 to receive the driving current ID, and a cathode of the light-emitting diode LD1 is coupled to the node ND1. In other embodiments of the disclosure, the light-emitting diode LD1 and the transistor NM1 may be coupled in a reversed order and are not limited to the order shown in FIG. 1.

The light-emitting element 140 includes a light-emitting diode LD2. The light-emitting diode LD2 may be a light-emitting diode of any form, such as a micro light-emitting diode or an organic light-emitting diode. An anode of the light-emitting diode LD2 may be coupled to the node ND1 to receive the driving current ID and the splitting current IS, and a cathode of the light-emitting diode LD2 is coupled to the reference ground voltage end VSS. The light-emitting diodes LD1 and LD2 may have the same electrical property or different electrical properties independent of each other. A designer may select the electrical properties of the light-emitting diodes LD1 and LD2 according to actual needs, without a fixed limitation.

Based on a variation relationship between the resistances provided by the drivers 110 and 120, when the display data V-Data is lower than the first threshold, the driving current ID provided by the driver 110 may be less than the splitting current IS provided by the driver 120. When the display data V-Data is higher than the second threshold, the driving current ID provided by the driver 110 may be greater than the splitting current IS provided by the driver 120.

Incidentally, in this embodiment, the reference ground voltage end VSS may provide a reference ground voltage of, for example, 0 volts or less than 0 volts.

Figure 2:
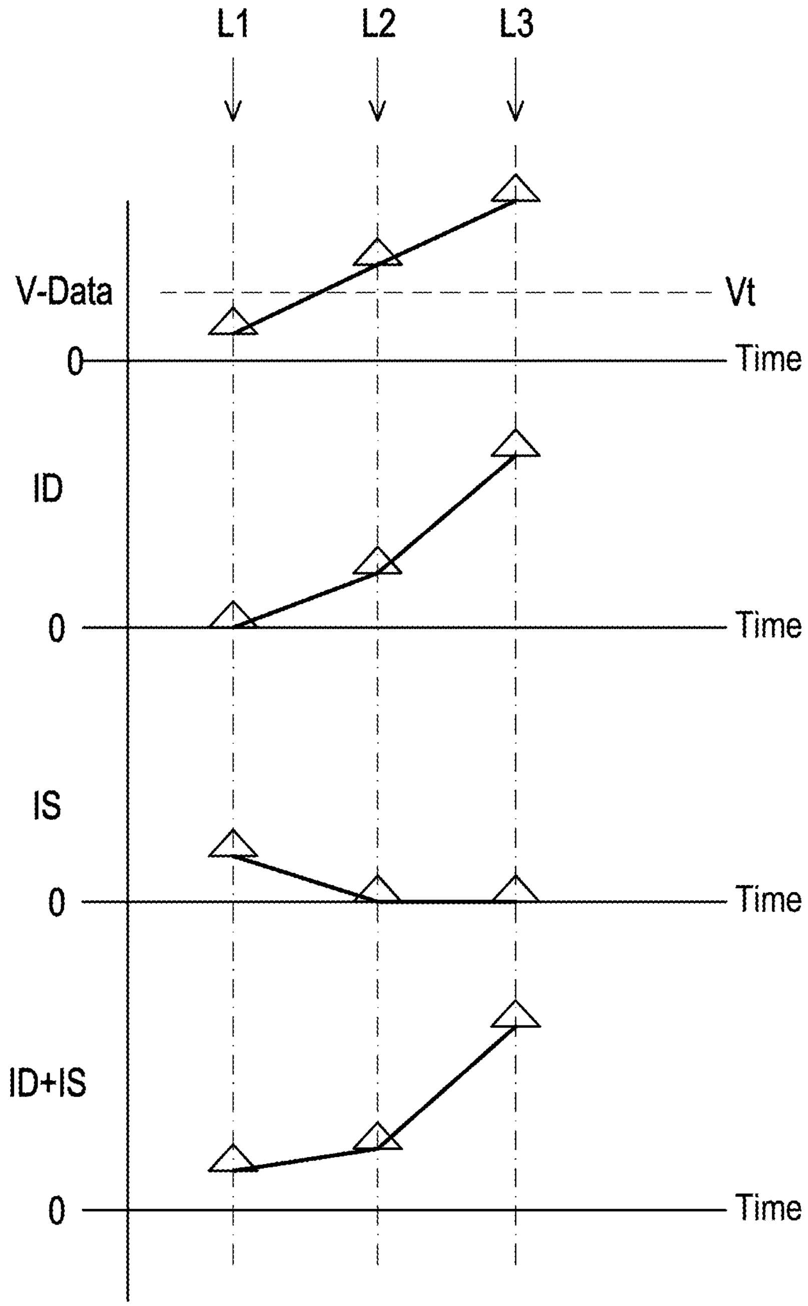
FIG. 2 is a schematic diagram of a variation relationship between a current and a display data of the pixel circuit in the embodiment of the disclosure.

Regarding the details of adjusting the display brightness of the pixel circuit 100, please refer to FIGS. 1 and 2 simultaneously. FIG. 2 is a schematic diagram of a variation relationship between a current and a display data of the pixel circuit in the embodiment of the disclosure. When the display data V-Data corresponds to a low grayscale display region L1, the transistor NM1 in the driver 110 is substantially turned off according to the display data V-Data with a relatively low voltage. Correspondingly, the transistor NM1 forms an open circuit, providing a relatively high resistance and a driving current ID that is substantially equal to 0. Under such conditions, the light-emitting diode LD1 does not emit light.

On the other hand, when the display data V-Data corresponds to the low grayscale display region L1, the transistor PM1 in the driver 120 is turned on according to the display data V-Data with the relatively low voltage. Correspondingly, the transistor PM1 may provide the splitting current IS through the current splitting path. Here, the splitting current IS may be greater than the driving current ID provided by the transistor NM1.

Similarly, when the display data V-Data corresponds to the low grayscale display region L1, the light-emitting diode LD2 may receive the driving current ID and the splitting current IS and provide a relatively low brightness.

When the display data V-Data corresponds to a middle grayscale display region L2, a voltage value of the display data V-Data is, for example, greater than a threshold voltage Vt of the driver 110. The transistor NM1 in the driver 110 is turned on according to the display data V-Data. Correspondingly, the transistor NM1 reduces the provided resistance and increases the provided driving current ID. In addition, the transistor PM1 in the driver 120 is gradually turned off according to the display data V-Data with an increased voltage. Under such conditions, the transistor PM1 may generate a splitting current IS that is, for example, 0. This way, the light-emitting diode LD1 and the light-emitting diode LD2 may provide brightness at a middle grayscale value at the same time according to the received driving current ID.

When the display data V-Data corresponds to a high grayscale display region L3, the transistor NM1 in the driver 110 increases a conduction degree according to the display data V-Data. Correspondingly, the transistor NM1 further reduces the provided resistance and further increases the provided driving current ID. In addition, the transistor PM1 in the driver 120 is completely turned off according to the display data V-Data with the increased voltage, generating a splitting current IS that is 0. This way, the light-emitting diode LD1 and the light-emitting diode LD2 may provide brightness at a high grayscale value at the same time according to the received driving current ID.

From the above description, it is known that when the display data V-Data corresponds to the low grayscale display region L1, the pixel circuit 100 reduces the brightness generated by the light-emitting element 130 or makes the light-emitting element 130 not emit light through the splitting current IS generated by the driver 120. Furthermore, a current density of a current (the driving current ID plus the splitting current IS) passing through the light-emitting element 140 is increased to maintain a luminous efficiency of the pixel circuit 100 and improve a luminous stability of the light-emitting element 140. When the display data V-Data corresponds to the high grayscale display region L3, the splitting current IS generated by the driver 120 may be reduced to 0, and the driving current ID is made passing through the light-emitting elements 130 and 140. This way, the light-emitting elements 130 and 140 emit light at the same time, enabling the entire pixel circuit 100 to achieve a higher peak brightness.

Figure 3A:
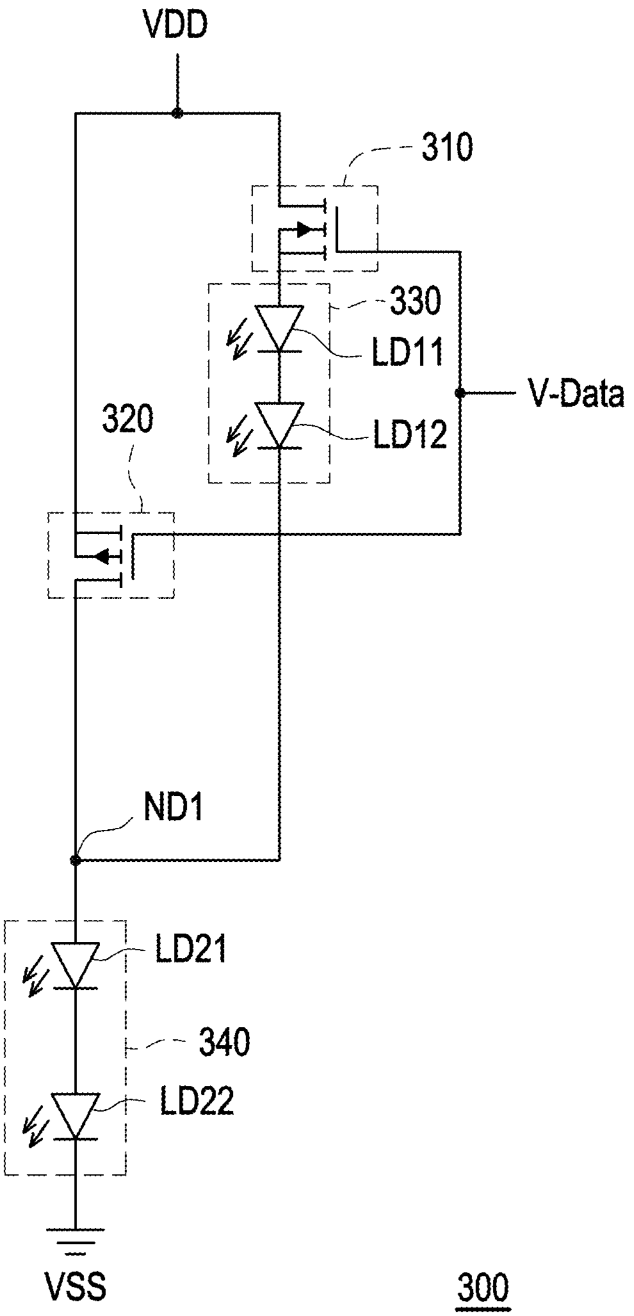
FIGS. 3A and 3B are schematic circuit diagrams of different implementation methods of the pixel circuit in the embodiment of the disclosure.
Figure 3B:
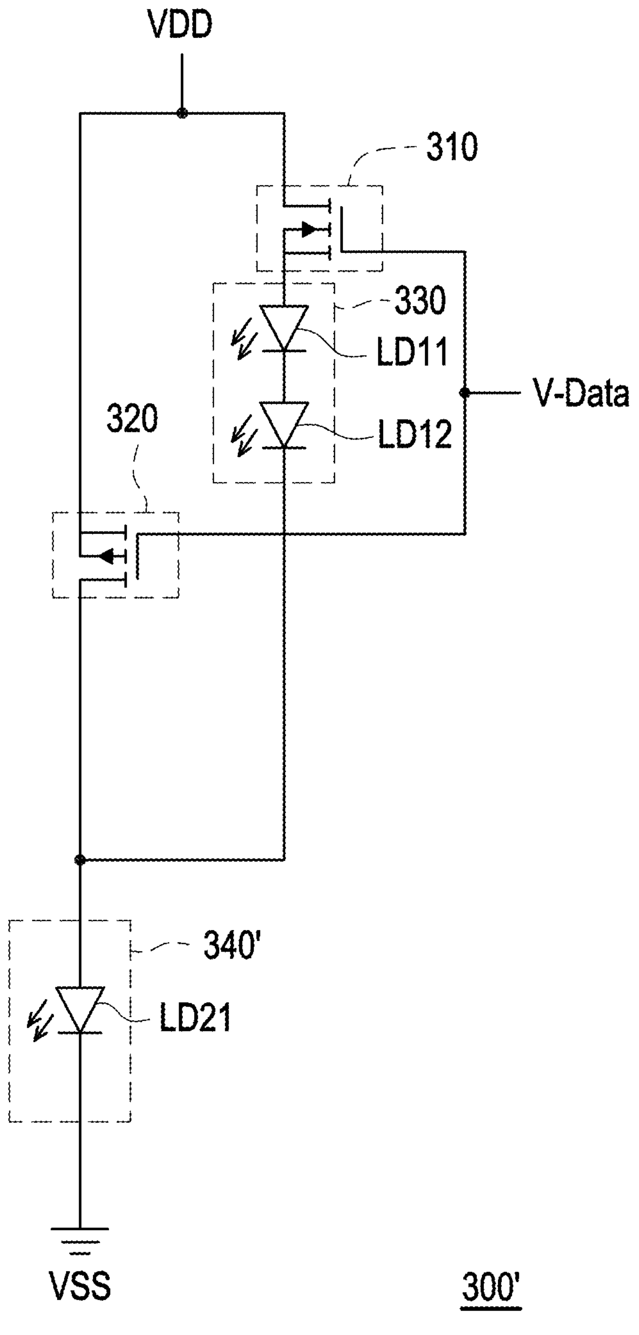

Please refer to FIGS. 3A and 3B. FIGS. 3A and 3B are schematic circuit diagrams of different implementation methods of the pixel circuit in the embodiment of the disclosure. A pixel circuit 300 includes drivers 310 and 320 and light-emitting elements 330 and 340. The coupling relationships and operation methods regarding the drivers 310 and 320 and the light-emitting elements 330 and 340 are similar to those of the pixel circuit 100 in the aforementioned embodiment, and are not repeated here.

Different from the aforementioned embodiment, in this embodiment, the light-emitting element 330 includes multiple light-emitting diodes LD11 and LD12 connected in series through a circuit substrate (not shown), and the light-emitting element 340 includes multiple light-emitting diodes LD21 and LD22 connected in series. The light-emitting diodes LD11 and LD12 form a first light-emitting diode string. An anode of the first light-emitting diode string is coupled to the power voltage end VDD, and a cathode of the first light-emitting diode string is coupled to the node ND1. The light-emitting diodes LD21 and LD22 form a second light-emitting diode string. An anode of the second light-emitting diode string is coupled to the node ND1, and a cathode of the second light-emitting diode string is coupled to the reference ground voltage end VSS. In this embodiment, it is required that a power voltage provided by the power voltage end VDD is enough for turning on the light-emitting diodes LD11, LD12, LD21, and LD22 as well as the driver 310 at the same time. Thus, the power voltage provided by the power voltage end VDD may be greater than the sum of the turn-on voltages of the light-emitting diodes LD11, LD12, LD21, and LD22 as well as the driver 310.

In FIG. 3B, a pixel circuit 300' includes the drivers 310 and 320, the light-emitting element 330, and a light-emitting element 340'. The coupling relationships and operation methods regarding the drivers 310 and 320 and the light-emitting elements 330 and 340' are similar to those of the pixel circuit 100 in the aforementioned embodiment, and are not repeated here.

Notably, in this embodiment, the light-emitting element 330 includes the light-emitting diodes LD11 and LD12 connected in series, and the light-emitting element 340' only includes a single light-emitting diode LD21. Here, by disposing the light-emitting element 340' with the single light-emitting diode LD21, a current density of a current (equal to the sum of the driving current and the splitting current) provided by the pixel circuit 300' and passing through the light-emitting diode LD21 is maintained in the low grayscale display region, thereby maintaining the luminous efficiency. In the high grayscale display region, the peak brightness may be increased through the light-emitting diodes LD11 and LD12 connected in series of the light-emitting element 330.

In this embodiment, it is required that a power voltage provided by the power voltage end VDD is enough for turning on the light-emitting diodes LD11, LD12, and LD21 as well as the driver 310 at the same time. Thus, the power voltage provided by the power voltage end VDD may be greater than the sum of the turn-on voltages of the light-emitting diodes LD11, LD12, and LD21 as well as the driver 310.

In the embodiments shown in FIGS. 3A and 3B, the number of light-emitting diodes LD11 to LD22 coupled in series in each of the light-emitting elements 330 and 340 may be more than two, without a specific limitation.

Figure 4A:
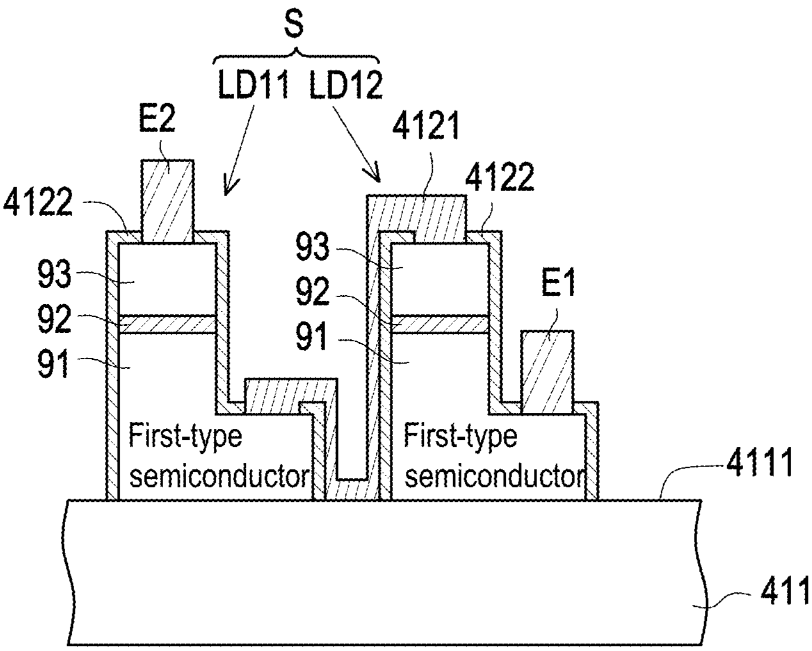
FIGS. 4A to 4C are schematic diagrams of a cross-sectional structure of a light-emitting diode in a light-emitting element of the pixel circuit in the embodiment of the disclosure.
Figure 4B:
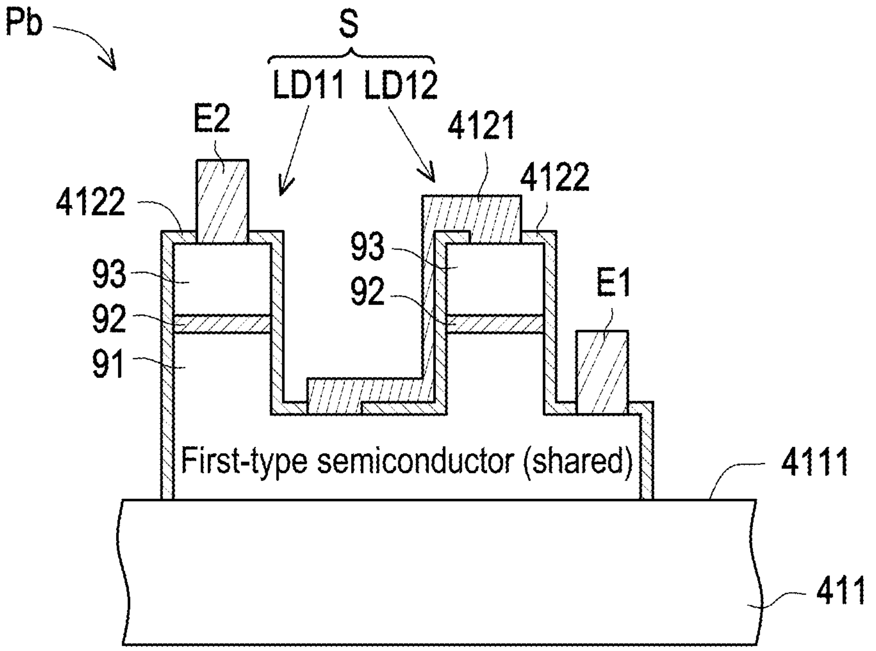
Figure 4C:
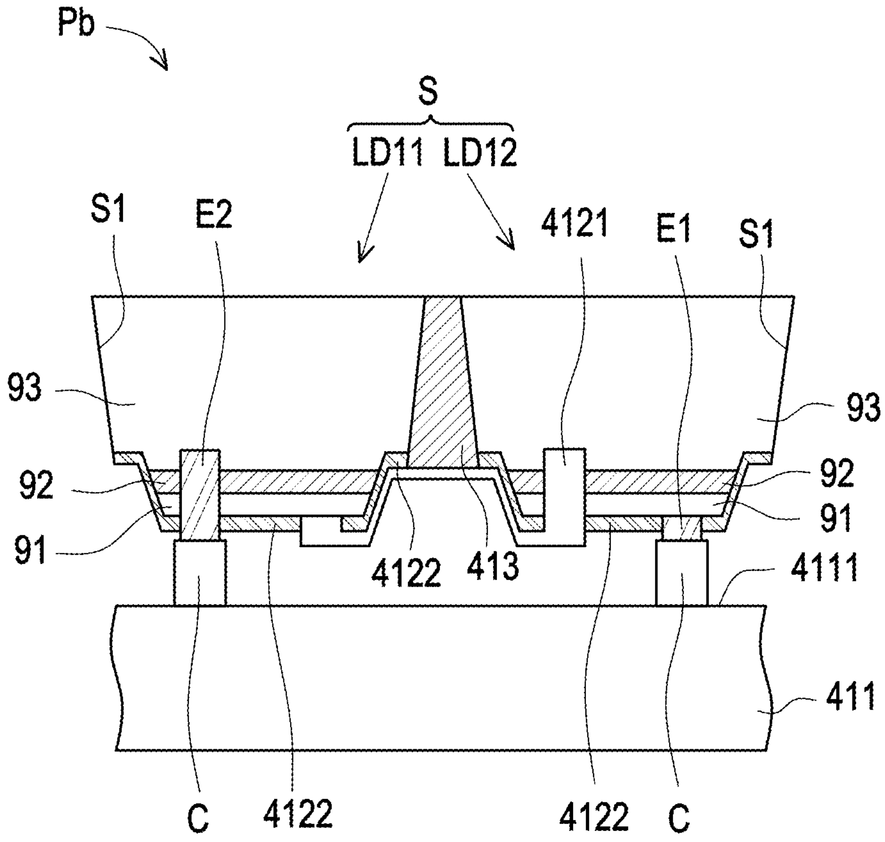

Please refer to FIGS. 4A to 4C. FIGS. 4A to 4C are schematic diagrams of a cross-sectional structure of a light-emitting element of the pixel circuit in the embodiment of the disclosure. Here, FIGS. 4A to 4C show structural schematic diagrams of light-emitting elements with light-emitting diodes connected in series.

In FIG. 4A, in each light-emitting element, a part of the light-emitting diodes form at least one series structure S within the element. The series structure S is formed with at least two light-emitting diodes LD11 and LD12 (e.g., micro light-emitting diodes) connected in series. In this embodiment, two micro light-emitting diodes are connected in series to form the series structure S, serving as an example. In different embodiments, the series structure S may also be formed with more than two micro light-emitting diodes connected in series. For example, the series structure S may be formed with four micro light-emitting diodes connected in series. Specifically, the series structure S in this embodiment includes two micro light-emitting diodes (e.g., the light-emitting diodes LD11 and LD12). The micro light-emitting diodes LD11 and LD12 in the series structure S have a wavelength range of a same emission color. Preferably, a difference between the wavelengths of the emission color of the two micro light-emitting diodes LD11 and LD12 is less than 2 nanometers (nm), thereby achieving better display effects. The emission color of both of the micro light-emitting diodes LD11 and LD12 in the series structure S of this embodiment is, for example, red, but is not limited thereto. In different embodiments, the emission color of the micro light-emitting elements in the series structure S may also be green or blue.

The micro light-emitting diodes LD11 and LD12 may be disposed on a circuit substrate 411 and respectively include a first-type semiconductor layer 91, a light-emitting layer 92, and a second-type semiconductor layer 93 disposed in an overlapping manner. The first-type semiconductor layer 91 is disposed on a surface 4111 of the circuit substrate 411, and the light-emitting layer 92 is sandwiched between the first-type semiconductor layer 91 and the second-type semiconductor layer 93. In this embodiment, the light-emitting layer 92 may be, for example, a multiple quantum well (MQW) layer. The first-type semiconductor layer 91 may be, for example, an N-type semiconductor, and the second-type semiconductor layer 93 may be, for example, a P-type semiconductor. However, the disclosure is not limited thereto. In different embodiments, the first-type semiconductor layer 91 may also be a P-type semiconductor, and the second-type semiconductor layer 93 may also be an N-type semiconductor. Here, the micro light-emitting diodes LD11 and LD12 may be horizontal micro light-emitting diodes, but are not limited thereto. In different embodiments, the micro light-emitting diodes LD11 and LD12 may also be vertical or flip-chip micro light-emitting diodes.

To drive the micro light-emitting diodes LD11 and LD12 to emit light, the series structure S of each display pixel P has a first electrode E1 and a second electrode E2 so as to be electrically connected to the circuit substrate 411. In addition, in order to connect the two micro light-emitting diodes LD11 and LD12 in series, the series structure S in this embodiment further includes a conductive layer 4121 and an insulating layer 4122. The conductive layer 4121 is disposed on the circuit substrate 411 to connect the two micro light-emitting elements LD11 and LD12 of the series structure S in series, and the insulating layer 4122 is disposed between the circuit substrate 411 and a part of the conductive layer 4121. Here, the conductive layer 4121 covers parts of the micro light-emitting diodes LD11 and LD12 and a part of the insulating layer 4122, so that the first-type semiconductor layer 91 of the micro light-emitting diode LD11 and the second-type semiconductor layer 93 of the micro light-emitting element LD12 are electrically connected to each other. In addition, the regions, away from the circuit substrate 411 and without the disposition of the first electrode E1, the second electrode E2, or the conductive layer 4121, on the surfaces of the micro light-emitting diodes LD11 and LD12 are covered with the insulating layer 4122. This not only provides an insulating effect but also protects the micro light-emitting diodes LD11 and LD12 from moisture or foreign matter intrusion.

It is particularly emphasized that in this embodiment, the step does not include designing a series circuit that has the micro light-emitting elements LD11 and LD12 connected in series on the circuit substrate 411. Instead, the series circuit (including the conductive layer 4121 and the insulating layer 4122) is fabricated between the two micro light-emitting diodes LD11 and LD12, so that the conductive layer 4121, the insulating layer 4122, and the micro light-emitting diodes LD11 and LD12 form the series structure S (i.e., the series structure S includes the two micro light-emitting elements LD11 and LD12, the conductive layer 4121, and the insulating layer 4122). Then, the series structure S is electrically connected to the circuit substrate 411 through a bonding pad (not shown) on the circuit substrate 411. Thus, in an unshown embodiment, the series structure may be established before the micro light-emitting diodes are disposed on the circuit substrate in mass transfer. When the micro light-emitting diodes are miniaturized to less than 50 micrometers, the connection between the two micro light-emitting diodes may also be enhanced through the series structure, thereby improving a transfer yield. Moreover, completing the series structure in the micro light-emitting diodes in the same region before transfer may result in a less wavelength difference, for example, less than 2 nanometers, between the micro light-emitting diodes. As the micro light-emitting diodes do not need grading before transfer, a better display effect may be achieved.

In this embodiment, the first-type semiconductor layer 91 of the micro light-emitting diode LD12 in the series structure S is connected to the first electrode E1, and the second-type semiconductor layer 93 of the micro light-emitting diode LD11 is connected to the second electrode E2. Then, the first electrode E1 and the second electrode E2 are respectively electrically connected to the conductive patterns and/or circuit layers corresponding to the circuit substrate 411 so as to receive a driving voltage (referred to as a first driving voltage herein) provided by the circuit substrate 411, thereby driving the micro light-emitting diodes LD11 and LD12 to emit red light. More specifically, an anode of the series structure S (e.g., the first electrode E1 in the figure) is coupled to the power voltage end VDD, and a cathode of the series structure S (e.g., the second electrode E2 in the figure) is coupled to the node ND1. In an unshown embodiment, the series structure S may be formed by connecting at least two light-emitting diodes LD21 and LD22 (e.g., micro light-emitting diodes) in series. The anode of the series structure is coupled to the node ND1, and the cathode of the series structure is coupled to the reference ground voltage end VSS. In addition, in this embodiment, other micro light-emitting diodes outside the series structure S maybe micro light-emitting elements G and B. The micro light-emitting elements G and B receive a same driving voltage (referred to as a second driving voltage herein) provided by the circuit substrate 411, thereby driving the micro light-emitting elements G and B to emit green and blue light respectively. Through the series structure S, a voltage across the micro light-emitting elements is increased, making the first driving voltage and the second driving voltage the same, for example, equal to 3.7V.

In FIG. 4A, a part of the conductive layer 4121 between the two micro light-emitting diodes LD11 and LD12 may directly contact the circuit substrate 411. It is noted that to prevent a short circuit from occurring to the conductive layer 4121 and the circuit substrate 411, the circuit substrate 411 requires insulating materials to isolate the conductive layer 4121 from a conductive circuit of the circuit substrate 411. The series structure S may be fabricated after the two micro light-emitting diodes LD11 and LD12 are transferred onto the circuit substrate 411, but is not limited thereto.

In FIG. 4B, regarding the light-emitting elements in this embodiment, the element composition and the connection relationships between the elements are generally the same as those of the light-emitting elements in the aforementioned embodiments. The difference is that in a light-emitting element Pb in this embodiment, the first-type semiconductors of the two micro light-emitting diodes LD11 and LD12 in the series structure S are connected to each other. That is, the micro light-emitting diodes LD11 and LD12 share the first-type semiconductor layer 91 (which is, e.g., of shared N-type). As the micro light-emitting diodes LD11 and LD12 do not need to be separated first, a spacing between the micro light-emitting diodes LD11 and LD12 may be further reduced, thereby increasing an utilization rate as well as improving the transfer yield by enhancing a connection strength during the mass transfer. Surely, in different embodiments, the shared semiconductor layer may be the second-type semiconductor layer 93 (which is, e.g., of shared P-type), without a limitation.

In FIG. 4C, regarding the light-emitting elements in this embodiment, the element composition and the connection relationships between the elements are generally the same as those of the light-emitting elements in the aforementioned embodiments. The difference is that the light-emitting element Pd in this embodiment further includes a filling structure 413. The filling structure 413 is disposed between sidewalls S1 of the two micro light-emitting diodes LD11 and LD12 in the series structure S, and contacts the sidewalls S1 of the micro light-emitting diodes LD11 and LD12 respectively. When the micro light-emitting diodes LD11 and LD12 are less than or equal to 50 micrometers, the fabrication of a stepped lower part leads to a decrease in a space utilization rate. Thus, the filling structure 413 is added between the micro light-emitting diodes LD11 and LD12. The purpose of disposing the filling structure 413 is to reduce a step between the micro light-emitting diodes LD11 and LD12, reduce challenges in fabricating the conductive layer 4121 and the insulating layer 4122, and increase the utilization rate of the micro light-emitting diodes. The filling structure 413 is fabricated with insulating materials. In some embodiments, the filling structure 413 may include inorganic materials (e.g., silicon dioxide). In some embodiments, the filling structure 413 may include organic materials (e.g., organic photoresists). In some embodiments, a surface of the filling structure 413 (i.e., the part contacting the micro light-emitting diodes LD11 and LD12) may have a reflective material so as to form a light-reflecting surface, thereby improving the light-emitting efficiency of the micro light-emitting diodes LD11 and LD12. In some embodiments, the surface of the filling structure 413 may have a light-absorbing material (e.g., a black photoresist) so as to form a light-absorbing surface, thereby preventing interference between the emitted lights. The filling structure 413 may also enhance the structural support for the micro light-emitting diodes LD11 and LD12. In particular, the filling structure 413 improves the transfer yield during transfer. If a light conversion structure (e.g., a quantum dot, which is not shown) is subsequently disposed on the micro light-emitting diodes LD11 and LD12, a flat upper surface may also provide a better fabrication yield.

Figure 5:
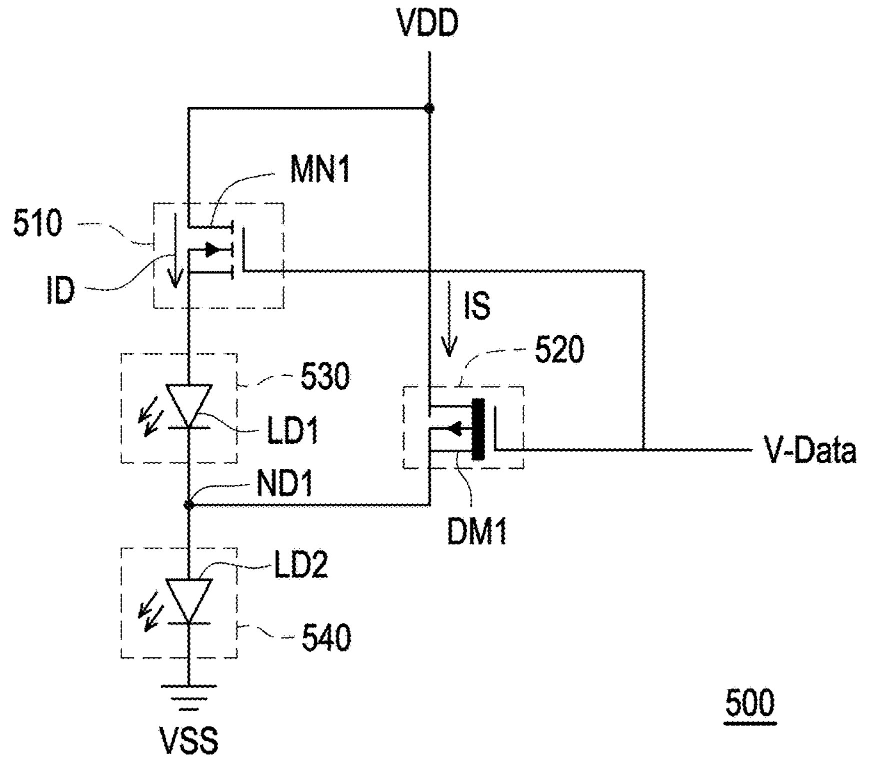
FIG. 5 is a schematic diagram of a pixel circuit in another embodiment of the disclosure.

Please refer to FIG. 5. FIG. 5 is a schematic diagram of a pixel circuit in another embodiment of the disclosure. A pixel circuit 500 includes drivers 510 and 530 and light-emitting elements 520 and 540. The coupling methods of the drivers 510 and 520 and the light-emitting elements 530 and 540 are similar to the coupling methods of the drivers 110 and 120 and the light-emitting elements 130 and 140 in the embodiment shown in FIG. 1, and are not repeated here.

It is worth mentioning that in this embodiment, the driver 530 used to provide the current splitting path may include a depletion-type P-type transistor DM1. A control end of the depletion-type P-type transistor DM1 may be in an always-on state when no voltage bias is received.

Figure 6:
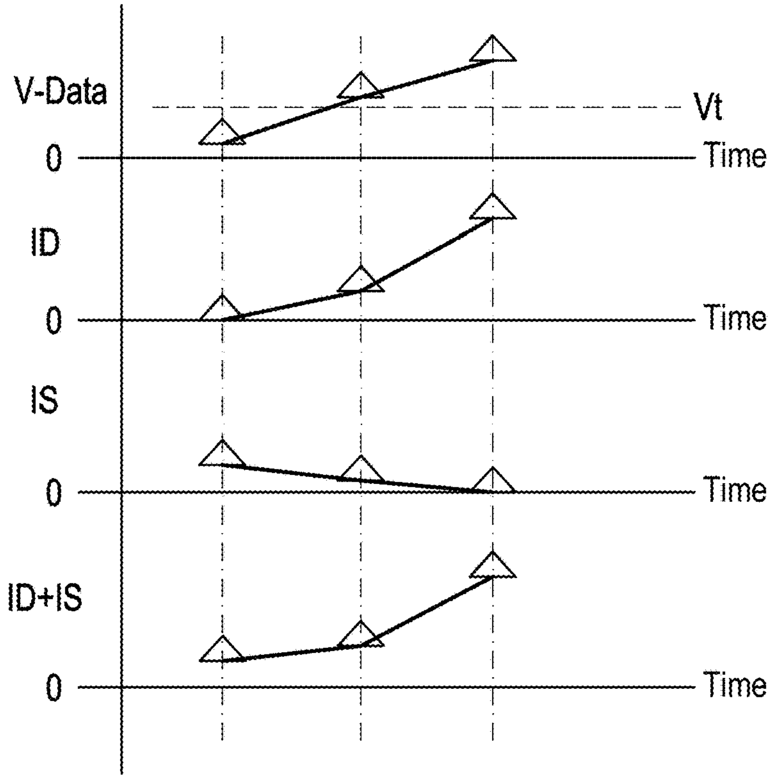
FIG. 6 is a schematic diagram of another variation relationship between a current and a display data of the pixel circuit in the embodiment of the disclosure.

Regarding the operating details of the pixel circuit 500, reference may be made to FIGS. 5 and 6 simultaneously. FIG. 6 is a schematic diagram of another variation relationship between a current and a display data of the pixel circuit in the embodiment of the disclosure. When the display data V-Data corresponds to a low grayscale display region L1, the transistor NM1 in the driver 510 is substantially turned off according to the display data V-Data with a relatively low voltage. Correspondingly, the transistor NM1 forms an open circuit, providing a relatively high resistance and a driving current ID that is substantially equal to 0. Under such conditions, the light-emitting diode LD1 does not emit light. On the other hand, the transistor DM1 in the driver 520 is in an on state and provides the splitting current IS through the current splitting path. Here, the splitting current IS may be greater than the driving current ID provided by the transistor NM1.

Similarly, when the display data V-Data corresponds to the low grayscale display region L1, the light-emitting diode LD2 may receive the driving current ID and the splitting current IS and provide a relatively low brightness.

When the display data V-Data corresponds to a middle grayscale display region L2, a voltage value of the display data V-Data is, for example, greater than a threshold voltage Vt of the driver 510. The transistor NM1 in the driver 510 is turned on according to the display data V-Data. Correspondingly, the transistor NM1 reduces the provided resistance and increases the provided driving current ID. In addition, the transistor DM1 in the driver 520 is nearly turned off according to the display data V-Data with an increased voltage. Under such conditions, the transistor PM1 may generate a splitting current IS that is relatively low. This way, the light-emitting diode LD1 and the light-emitting diode LD2 may provide brightness at a middle grayscale value at the same time according to the received driving current ID and the sum of the received driving current ID and the splitting current IS respectively.

When the display data V-Data corresponds to a high grayscale display region L3, the transistor NM1 in the driver 510 increases a conduction degree according to the display data V-Data. Correspondingly, the transistor NM1 further reduces the provided resistance and further increases the provided driving current ID. In addition, the transistor PM1 in the driver 520 is completely turned off according to the display data V-Data with the increased voltage, generating a splitting current IS that is 0. This way, the light-emitting diode LD1 and the light-emitting diode LD2 may provide brightness at a high grayscale value at the same time according to the received driving current ID.

Figure 7:
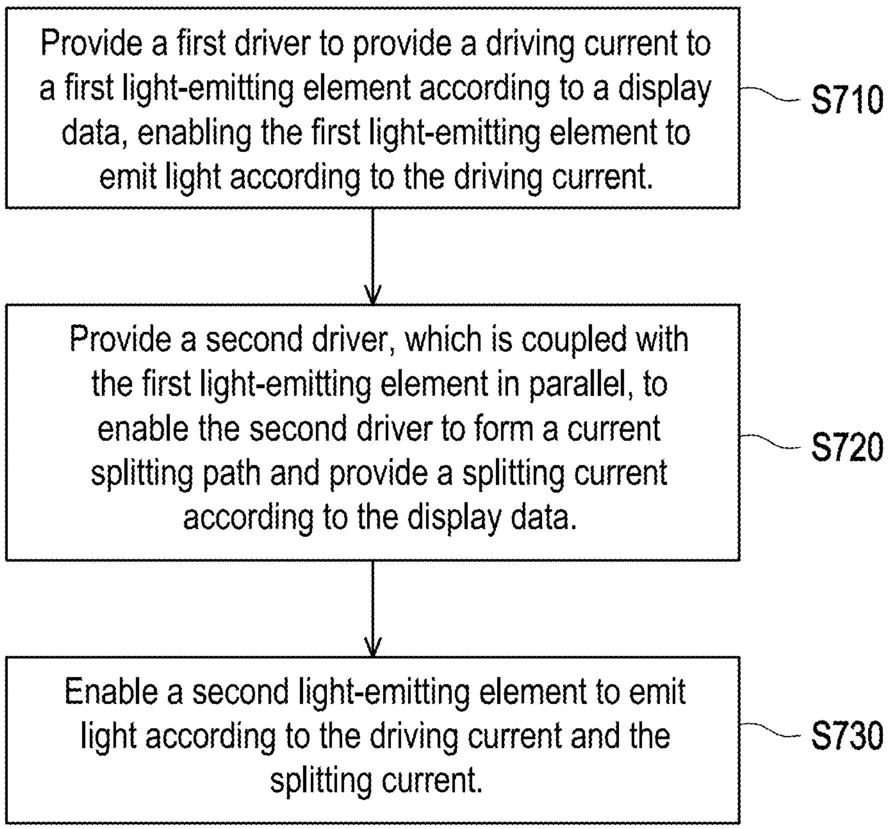
FIG. 7 is a flowchart of a display brightness adjusting method for a pixel circuit in an embodiment of the disclosure.

Please refer to FIG. 7. FIG. 7 is a flowchart of a display brightness adjusting method for a pixel circuit in an embodiment of the disclosure. In Step S710, a first driver is provided to provide a driving current to a first light-emitting element according to a display data, enabling the first light-emitting element to emit light according to the driving current. In Step S720, a second driver is provided. The second driver is coupled with the first light-emitting element in parallel, enabling the second driver to form a current splitting path and provide a splitting current according to the display data. Further, in Step S730, a second light-emitting element is enabled to emit light according to the driving current and the splitting current.

The details of implementing the above steps have been thoroughly described in the aforementioned embodiments and methods, and are not repeated here.

In summary, in the disclosure, the splitting current is adjusted through the current splitting path provided by the second driver corresponding to a brightness for displaying data, thereby adjusting a brightness of the first light-emitting element. This way, at a low grayscale display brightness, the current density of the second light-emitting element is increased by the second driver through the current splitting path, thereby maintaining the luminous efficiency. At a high grayscale display brightness, the first and second light-emitting elements emit light simultaneously, effectively increasing the peak brightness that the pixel circuit can provide.

What is claimed is:

1. A pixel circuit, comprising:

a first driver, used to provide a driving current according to a display data;

a first light-emitting element, coupled with the first driver in series between a power voltage end and a node, the first light-emitting element receiving the driving current and emitting light according to the driving current;

a second driver, coupled with the first light-emitting element in parallel, the second driver forming a current splitting path and providing a splitting current according to the display data; and a second light-emitting element, coupled between the node and a reference ground voltage end, the second light-emitting element receiving the driving current and the splitting current, and emitting light according to the driving current and the splitting current, wherein when the display data is lower than a first threshold, the driving current is less than the splitting current, and when the display data is higher than a second threshold, the driving current is greater than the splitting current, wherein the first threshold is less than or equal to the second threshold.

2. The pixel circuit according to claim 1, wherein when the display data is lower than a first threshold, a first resistance provided by the first driver is greater than a second resistance provided by the second driver, and when the display data is higher than a second threshold, a third resistance provided by the first driver is less than a fourth resistance provided by the second driver, wherein the first threshold is less than or equal to the second threshold.

3. The pixel circuit according to claim 1, wherein the first driver comprises:

a first transistor, coupled between the power voltage end and the first light-emitting element, or coupled between the first light-emitting element and the node, wherein a control end of the first transistor receives the display data.

4. The pixel circuit according to claim 3, wherein the second driver comprises:

a second transistor, coupled between the power voltage end and the node, wherein a control end of the second transistor receives the display data.

5. The pixel circuit according to claim 4, wherein a conductivity type of the first transistor is opposite to a conductivity type of the second transistor.

6. The pixel circuit according to claim 4, wherein the first transistor is an N-type transistor, and the second transistor is a P-type transistor.

7. The pixel circuit according to claim 4, wherein when the second driver does not receive the display data, the second transistor is in an on state.

8. The pixel circuit according to claim 1, wherein the first light-emitting element comprises:

a first light-emitting diode, having an anode to be coupled to the power voltage end, a cathode of the first light-emitting diode being coupled to the node, wherein the second light-emitting element comprises:

a second light-emitting diode, having an anode to be coupled to the node, a cathode of the second light-emitting diode being coupled to the reference ground voltage end.

9. The pixel circuit according to claim 1, wherein the first light-emitting element comprises:

a plurality of first light-emitting diodes, connected to each other in series to form a first light-emitting diode string, an anode of the first light-emitting diode string being coupled to the power voltage end, and a cathode of the first light-emitting diode string being coupled to the node, wherein the second light-emitting element comprises:

a plurality of second light-emitting diodes, connected to each other in series to form a second light-emitting diode string, an anode of the second light-emitting diode string being coupled to the node, and a cathode of the second light-emitting diode string being coupled to the reference ground voltage end.

10. A display brightness adjusting method, comprising:

providing a first driver to provide a driving current to a first light-emitting element according to a display data, such that the first light-emitting element emits light according to the driving current;

providing a second driver, the second driver being coupled with the first light-emitting element in parallel, such that the second driver forms a current splitting path and provides a splitting current according to the display data; and enabling a second light-emitting element to emit light according to the driving current and the splitting current, when the display data is lower than a first threshold, enabling the driving current to be less than the splitting current; and when the display data is higher than a second threshold, enabling the driving current to be greater than the splitting current, wherein the first threshold is less than or equal to the second threshold.

11. The display brightness adjusting method according to claim 10, further comprising:

when the display data is lower than a first threshold, enabling a first resistance provided by the first driver to be greater than a second resistance provided by the second driver; and when the display data is higher than a second threshold, enabling a third resistance provided by the first driver to be less than a fourth resistance provided by the second driver, wherein the first threshold is less than or equal to the second threshold.

* * * * *